Feb. 1, 1927.
J. M. BARDERA
TOILET ARTICLE
Filed May 2, 1924
1,616,104
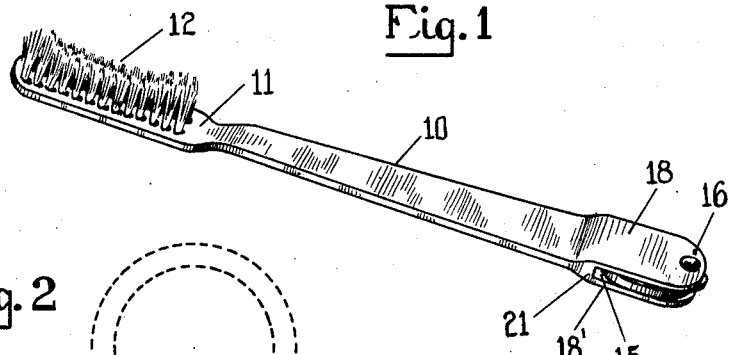
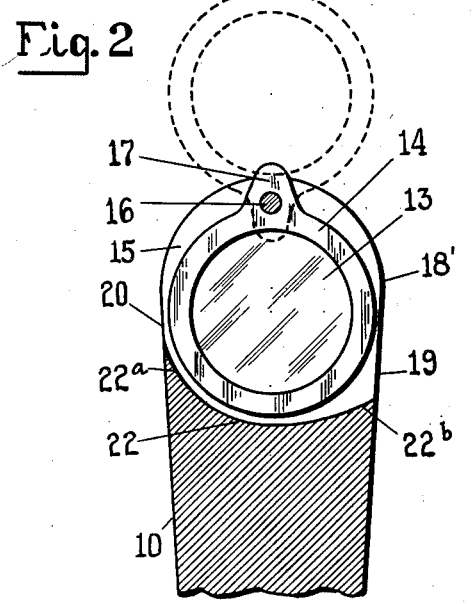
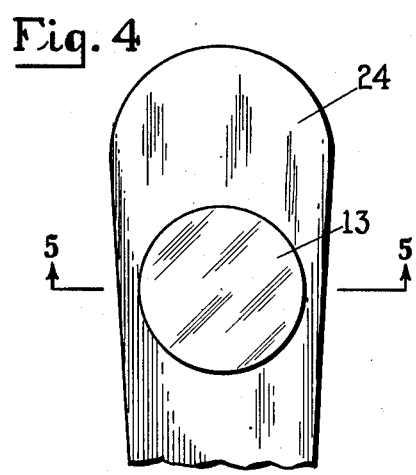
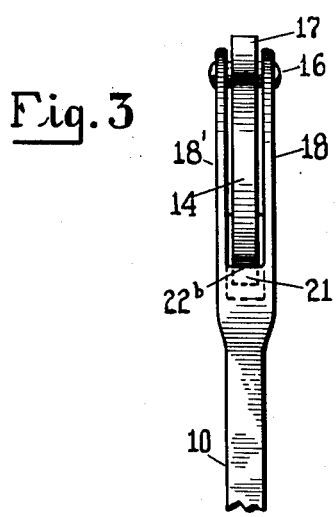
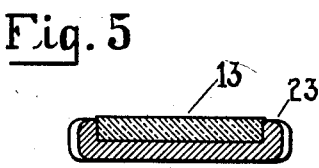
Inventor
JOSE NARTINEZ BARDERA
By his Attorney Patented Feb. 1, 1927.

1,616,104

UNITED STATES PATENT OFFICE

JOSE MARTINEZ BARDERA, OF BROOKLYN, NEW YORK.

TOILET ARTICLE.

Application filed May 2, 1924. Serial No. 710,483.

This invention relates to toilet articles. More particularly, it is directed to improvements in a combined tooth brush and mirror, among the objects of the invention being to provide a practical device of the character described which shall be exceedingly simple in construction, comparatively cheap to manufacture, and yet neat in appearance and simple, easy, and efficient in operation.

Other objects of the invention will in part be obvious and in part hereinafter set forth.

The invention accordingly consists in the features of construction, combinations of elements and arrangement of parts which will be exemplified in the construction hereinafter described and of which the scope of application will be indicated in the following claim.

In the accompanying drawing, in which is shown one of the various possible illustrative embodiments of this invention, Fig. 1 is a perspective view of an embodiment of my invention;

Fig. 2 is a fragmentary sectional view thereof; showing the mirror end of the device with the mirror in operative and inoperative positions;

Fig. 3 is a fragmentary end elevational view corresponding to Fig. 2.

Fig. 4 is a partial plan view of the mirror end of the device showing a modified form; and Fig. 5 is a cross-sectional view thereof taken along line 5—5 of Fig. 4.

Referring in detail to the drawing, 10 indicates a brush handle having a head portion 11 to which is secured in any suitable manner the brush handle. At the opposite end of the handle, a mirror 13 is provided which is set into a frame 14 and preferably swingably secured to the said end of the handle in the manner now to be described.

The end of the handle is split to provide a socket 15 for the mirror which is pivotally connected adjacent the extreme end of the socket by means of a pivot pin 16 passing through an ear 17 extending from the frame 14 and the two walls 18, 18′ of the socket. It will be understood, of course, that sufficient material is cut away from the end of the handle so as to provide sufficient thickness so as to snugly house the mirror and frame, and preferably, in cutting the material out, the opening on one side of the socket is made larger as at 19 so that while the mirror can be swung out of the socket through said opening 19, the opening 20 on the other side is substantially smaller than the diameter of the mirror so as to prevent the mirror from being swung out through said opening. Preferably, the bottom wall 21 of the socket is cut out in the shape of a curve 22 which is higher adjacent the opening 20 as at 22ª and lower adjacent the opening 19 as at 22ᵇ, so that the wall 22ª acts as a stop, while sufficient space is afforded to permit the mirror to freely swing through the opening 19 into the position shown in dotted lines in Fig. 2.

The mirror end of the handle is preferably enlarged as will be clear from the drawing, so as to provide ample space for a handy and neat mirror of sufficient diameter to serve the desired purpose and so as to confine the mirror completely within the handle without requiring any separate attaching members for securing the mirror to the tooth brush, thus maintaining the ordinary standard length of tooth brush handle.

In the modified form shown in Figs. 4 and 5, the mirror 13 is rigidly held in a socket 23 cut in the face of the enlarged end 24 of the handle.

In the use of the tooth brush to cleanse the teeth, it is often desirable to be able to examine or look at the teeth, and where no mirror is handy, a tooth brush made in accordance with the invention will effectively serve the purpose inasmuch as the mirror is secured on the usual tooth brush handle always ready for use.

It will thus be seen that there is provided a device in which the several objects of this invention are achieved and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative and not in a limiting sense.

Having thus described my invention, I claim as new and desire to secure by Letters Patent:—

A handle adapted to carry a brush on one end and having the other end split so as to provide a recess with a curved bottom wall having one end thereof extending closer to the extreme end of the handle than the other, a frame carrying a mirror of substantially circular shape pivoted adjacent said extreme end to swing in and out of the said recess in one direction, the portion of said curved wall of the recess adjacent the first mentioned end forming an abutment stop for engaging the frame to prevent swinging of the mirror except in said one direction, said handle being of greater width than thickness and having substantial shouldered portions formed on the wider side thereof adapted to engage with means for suspending the brush.

In testimony whereof I affix my signature.

JOSE MARTINEZ BARDERA.